Figure 1:
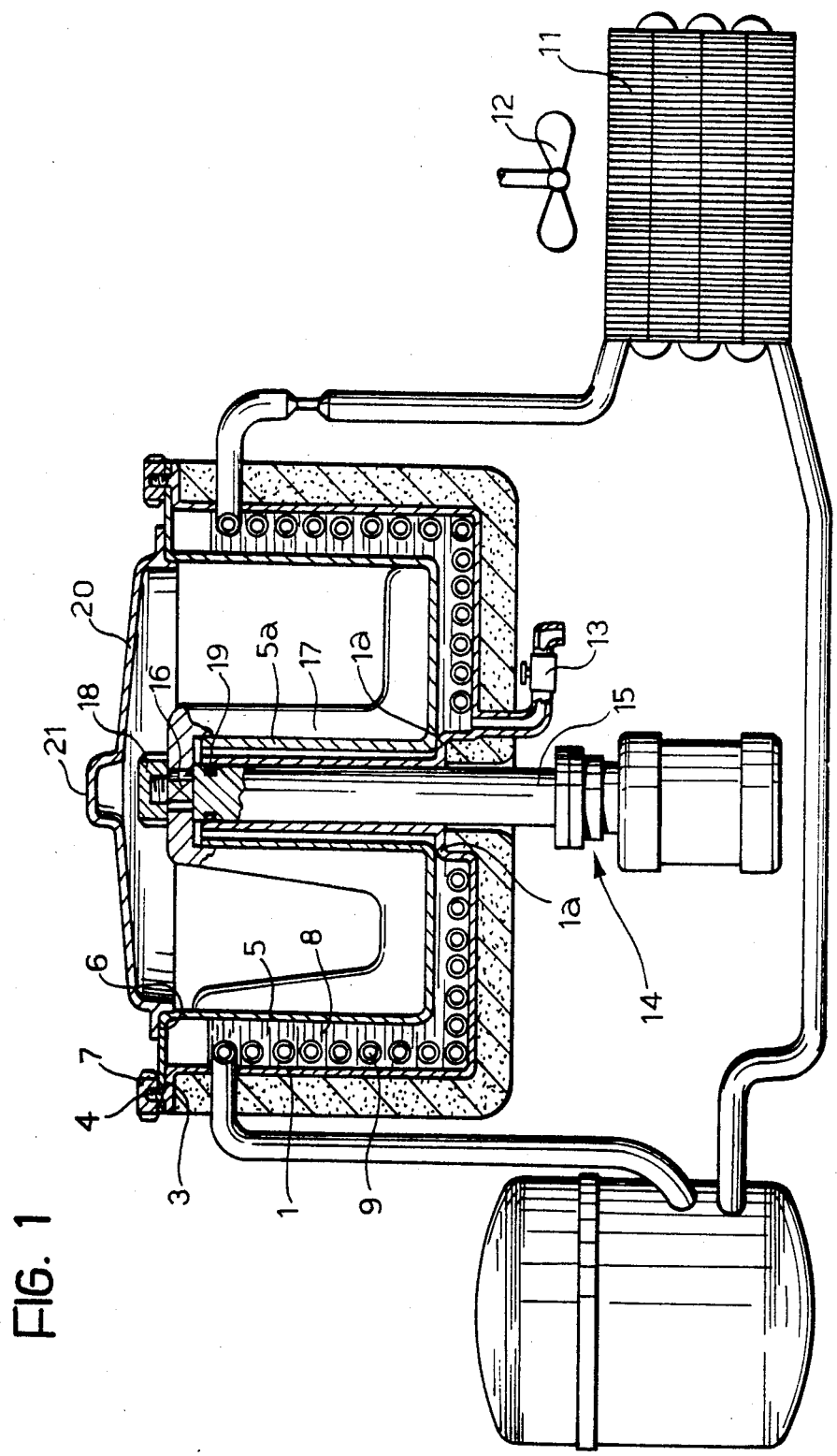

United States Patent [19]

Pandolfi

[11] Patent Number: 4,583,863

[45] Date of Patent: Apr. 22, 1986

[54] HOUSEHOLD ICE-CREAM MACHINE

[75] Inventor: Alberto Pandolfi, Milan, Italy

[73] Assignee: Brevetti Gaggia S.p.A., Milan, Italy

[21] Appl. No.: 542,048

[22] Filed: Oct. 14, 1983

[30] Foreign Application Priority Data

Oct. 14, 1982 [IT] Italy .................. 53814/82[U]
Dec. 30, 1982 [IT] Italy .................. 54143/82[U]

[51] Int. Cl.$^4$ .................. A23C 3/04; B01F 7/16; A23G 9/00
[52] U.S. Cl. .................. 366/149; 99/455; 62/342; 366/314
[58] Field of Search .............. 366/144, 149, 129, 130, 366/197, 200, 201, 279, 242, 244, 246, 247, 252–254, 292, 293, 309, 312, 347, 314; 62/114, 136, 342, 343; 317/76; 220/426, 428; 99/452–455, 460; D15/82; 165/109 R

[56] References Cited

U.S. PATENT DOCUMENTS

| 607,362 | 7/1898 | Graeff .................. 366/149 X |
| 3,952,538 | 4/1976 | Warlick .................. 62/342 |
| 4,070,957 | 1/1978 | Korekawa et al. .......... 366/149 X |
| 4,149,271 | 4/1979 | Uibel et al. .............. 366/314 |
| 4,429,549 | 2/1984 | Randolphi ................ 62/342 |
| 4,488,817 | 12/1984 | Uesaka et al. ............ 366/149 |

Primary Examiner—Timothy F. Simone
Attorney, Agent, or Firm—Pearne, Gordon, Sessions, McCoy, Granger & Tilberry

[57] ABSTRACT

A household ice-cream machine has an annular container in which a blade driven by a geared motor is rotatable, the container being releasably supported within an annular vessel so as to define an interspace containing a measured quantity of a liquid with a low freezing point.

The cooling system of the ice-cream machine includes an evaporator coil disposed in favorable heat-exchange relationship with the liquid in the said interspace.

7 Claims, 4 Drawing Figures

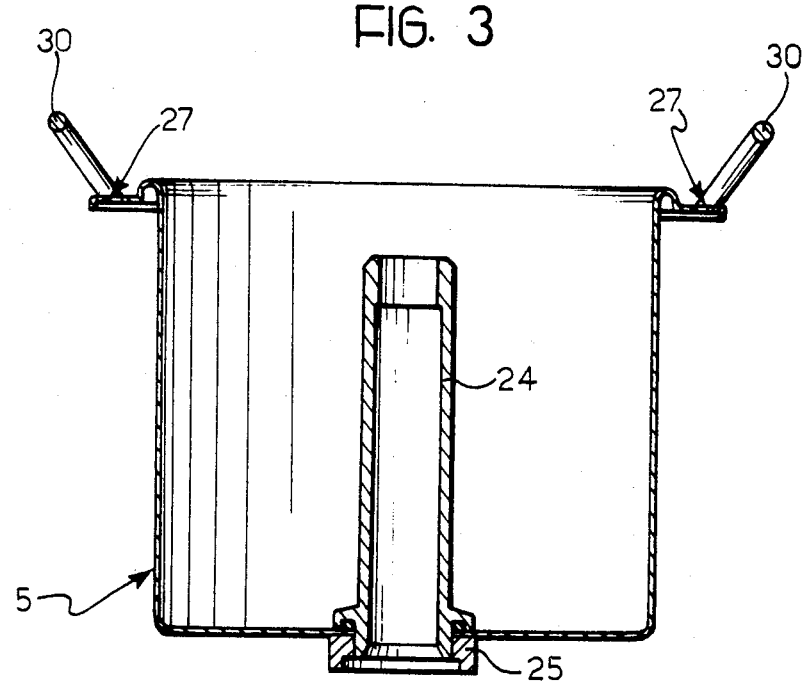
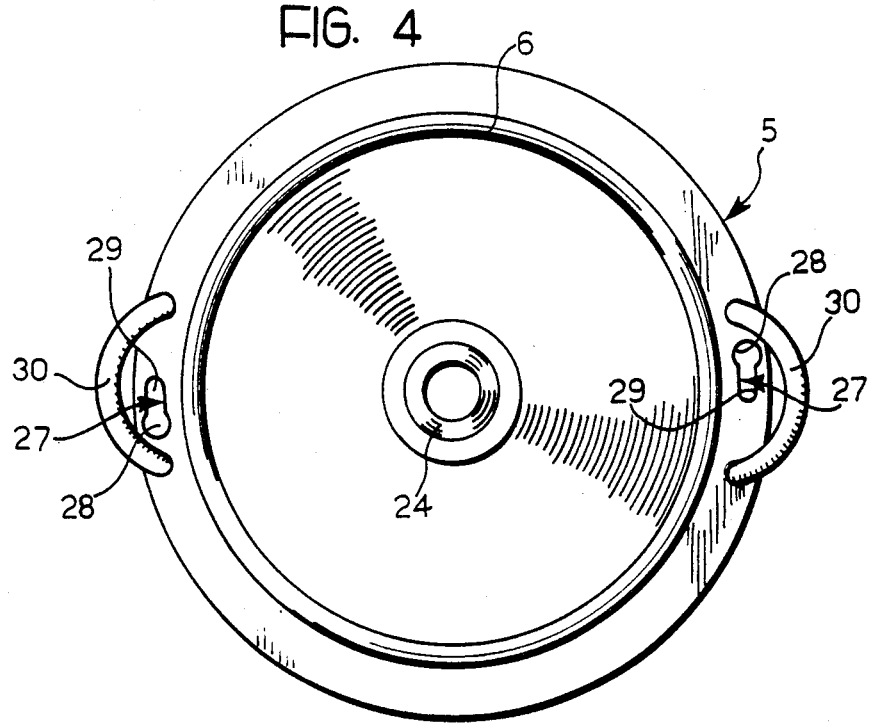

HOUSEHOLD ICE-CREAM MACHINE

The present invention relates to household ice-cream machines comprising an annular container within which a blade driven by a geared motor is rotatable, and a cooling system comprising a motor compressor, a condenser and an evaporator coil adjacent the outer surface of the outer side wall and the bottom of the annular container.

In known ice-cream machines of the said type the container is fixed to the structure of the ice-cream machine and the evaporator is in direct contact with the wall of the container itself.

This solution makes the cleaning of the container difficult and this cleaning problem means that, among other things, it is not possible to make ice creams of different types in rapid succession as would, in certain cases, be desirable.

In order to avoid this disadvantage, the present invention provides an ice-cream machine, particularly for household use, of the type defined at the beginning, the main characteristic of which lies in the fact that the container is releasably supported within an annular vessel so as to define an interspace between the container and the vessel; the vessel contains such a quantity of a low-freezing-point liquid as to fill the interspace when the container is assembled within the vessel, and the evaporator is disposed in favourable heat exchange relationship with the liquid in the interspace.

This characteristic greatly facilitates cleaning by virtue of the possibility of removing the annular container from the ice-cream machine. The annular container, of small bulk and weight, may in fact easily be rinsed and washed like an ordinary cooking utensil.

According to the invention the interspace is defined by the outer side wall and the bottom of the annular container.

According to a first embodiment of the invention, the evaporator is housed within the interspace so as to be immersed in the low-freezing-point liquid when the container is assembled in the vessel.

In a variant of the invention, the annular vessel is of a material with a high thermal conductivity and the evaporator is welded to the outer surface of the outer side wall and the bottom of the vessel.

Thus the evaporator is no longer immersed in the low-freezing-point liquid, which further simplifies the periodic cleaning of the annular container. With this solution it is also possible to reduce the capacity of the interspace and hence the volume of low-freezing-point liquid with the advantage, on the one hand, of an appreciable improvement in the delivery of the cooling system and on the other hand of making the removal of the annular container from and its re-insertion in the ice-cream machine easier and more convenient.

Moreover the evaporator coil, even when the annular container is removed, is protected and screened by the annular vessel and is invisible from the exterior, with obvious additional advantages from an aesthetic point of view.

Figure 2:
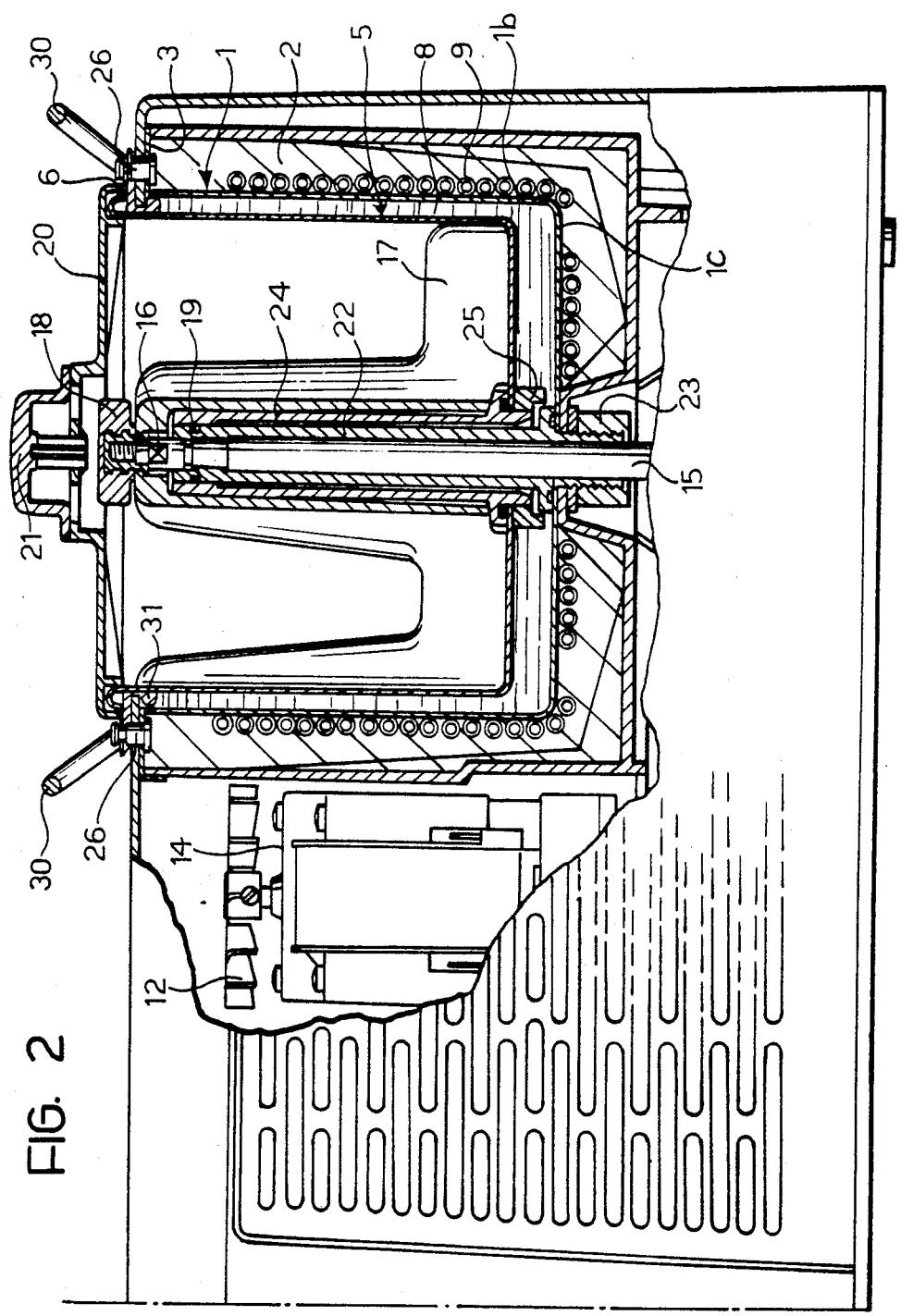

The invention will now be described in detail with reference to the appended drawings, provided purely by way of non-limiting example, in which:

FIG. 1 is a partially sectioned schematic view of a household ice-cream machine according to a first embodiment of the invention, FIG. 2 is a view similar to FIG. 1 of a second embodiment of the ice-cream machine according to the invention, FIG. 3 illustrates a detail of FIG. 2, and FIG. 4 is a plan view of FIG. 1 from above.

Referring initially to FIG. 1, an annular vessel 1 is fixed to the support structure (not illustrated) of a household ice-cream machine and has external thermal insulation indicated 2.

The outer edge of the vessel 1 has an annular flange 3 bent horizontally outwardly to which are fixed vertical-axis screws 4.

An annular container 5 is located within the vessel 1 and has an annular flange 6 around its outer edge, bent horizontally outwardly and resting on the flange 3 of the vessel 1.

The flange 6 has holes in which the screws 4 are engaged. Nuts 7 are screwed to the latter to secure the container 5 releasably to the vessel 1. The nuts 7 are conveniently forxed so as to be rapidly operable by hand; they may for example be of the winged type or of the cylindrical type with a knurled outer surface.

The radially inner part of the bottom of the container 5 also rests on a step 1a formed on the bottom of the vessel 1.

The container 5 has smaller dimensions than those of the vessel 1 whereby there is an interspace 8 between the outer walls and the bottom of the vessel containing a liquid with a low freezing point, for example a saline solution (brine).

Within the interspace 8 there is also an evaporator coil 9 beneath the level of the low-freezing-point liquid and forming part of a cooling system including a motor-driven compressor 10 and a condenser 11 cooled by a fan 12.

The function of the low-freezing-point liquid in the interspace 8 is to ensure good cold transmission from the evaporator 9 to the container 5 without direct metal contact between the two parts.

A tap for discharging the low-freezing-point liquid is indicated 13 and a geared motor unit is indicated 14 which rotates a shaft 15 through a clutch (not visible), the shaft extending vertically through the central cavity of the vessel 1 and carrying a sealing washer 19. As is seen in the drawing, the shaft 15 is surrounded by the inner side wall 1b of the vessel 1 which in its turn is surrounded by the inner side wall 5a of the annular container 5.

To the free end of the shaft 15 there is keyed, by a prismatic coupling 16, a blade 17 housed in the usual manner in the container 5. The end of the shaft 15 is threaded and a manually-operable nut 18 is screwed on to it so as to lock the blade 17 axially on the shaft 15.

Reference 20 indicates a removable lid for closing the container, the lid having a central hand-grip 21 for its handling.

It will be clear from the above that, after operation of the ice-cream machine, the annular container 5 may rapidly be removed to allow rinsing and cleaning by the simple removal of the lid 20, the nuts 7, the nut 18 and the blade 17.

The variant illustrated in FIGS. 2 to 4 is generally similar to the embodiment described above and only the differences will be described in detail, the same reference numerals being used for identical or similar parts.

In this variant, the outer side wall 1b and the base wall 1c of the annular vessel 1 are of a material with a high thermal conductivity, normally copper, and the evaporator coil 9 is welded to the outer surface of the walls 1b and 1c. Consequently the evaporator 9 is no longer immersed in the low-freezing-point liquid in the interspace 8, which further simplifies the periodic cleaning of the container 5. The evaporator 9 is thus effectively protected by the vessel 1 even when the annular container 5 is removed and there is the added advantage that the dimensions of the interspace 8, and consequently the volume of the low-freezing-point liquid, can be reduced.

In this variant, the inner wall of the vessel 1 is formed by a tubular casing 22 fitted onto the shaft 15 and locked to the bottom of the vessel 1 by means of a ring nut 23. Similarly, the inner wall of the annular container 5 is formed by a tubular casing 24 which surrounds the casing 22 and is locked to the base wall of the container 5 by a ring nut 25.

The releasable connection between the container 5 and the vessel 1 is achieved by means of a pair of grooved pins 26 welded to the annular flange 3 of the vessel 1 and projecting vertically upwardly to engage corresponding elongate apertures 27 forxed in the annular flange 6 of the container 5. As is clearly illustrated in FIG. 4, each aperture 27 has an initial enlarged part 28 arranged to allow passage of the respective pin 26 and a narrow terminal part 29 for engagement of the groove in the pin 26 on rotation of the container 5. In order to facilitate the removal and re-insertion of the container 5, two handles 30 are fixed to the annular flange 6.

In order to achieve effective hermetic closure of the interspace 8 when the annular container is inserted, an annular washer 31 of resiliently yielding material is located between the annular flange 6 and the outer edge of the vessel 1.

The geared motor unit 14 is disposed adjacent the vessel 1, parallel to the shaft 15, in this variant. The connection of the unit 14 to the shaft 15 is achieved by means of a toothed transmission belt, not visible in the drawings, through a clutch of conventional type.

I claim:

1. Household ice-cream machine, comprising an annular container adapted to hold a quantity of ice-cream ingredients, a blade mounted in the container; a geared motor drivingly connected to said blade, and a cooling system including a motor-compressor, a condenser and an evaporator coil, wherein the improvements consist in:

an annular vessel;

means releasably supporting the annular container within the annular vessel and preventing rotation of the annular container with respect to the annular vessel;

there being a substantial interspace between the annular container and the annular vessel when the annular container is assembled therein, said interspace being further defined by an outer side wall and bottom of the annular container, said interspace containing a quantity of low-freezing point solution such that the annular container is substantially immersed in said low-freezing point solution, and the evaporator coil being disposed in favorable heat-exchange relationship with said low-freezing point liquid in said interspace, wherein the annular container is easily removable from the annular vessel for cleaning after use by simply releasing said supporting means.

2. Ice-cream machine as defined in claim 1, wherein the evaporator coil is housed within the interspace so as to be immersed in the low-freezing-point liquid when the annular container is assembled in the vessel.

3. Ice-cream machine as defined in claim 1, wherein the annular vessel is of a material with a high thermal conductivity and the evaporator coil is welded to an outer surface of the outer side wall and bottom of the vessel.

4. Ice-cream machine as defined in claim 1, wherein an outer edge of the container has a horizontally outwardly projecting annular flange which rests on a corresponding flange of an outer edge of the vessel, and including releasable locking means for fixing said flanges together.

5. Ice-cream machine as defined in claim 4, wherein the releasable locking means are screw means.

6. Ice-cream machine as defined in claim 4, wherein the releasable locking means comprise grooved pins which engage corresponding apertures having enlarged ends in the annular flange of the container and wherein sealing means are interposed between the flange of the container and the corresponding edge of the vessel.

7. Ice-cream machine as defined in claim 1 including a vertical shaft, means removably coupling the blade to said vertical shaft, a lower end of said shaft being drivingly connected to the geared motor, said shaft extending into a central cavity of the annular vessel, and sealing means interposed between an upper end of the shaft and an inner wall of the annular container.

* * * * *